United States Patent [19]

Simpson

[11] 4,001,877
[45] Jan. 4, 1977

[54] METHOD OF MEASURING COLOR PURITY TOLERANCE OF A COLOR DISPLAY TUBE

[75] Inventor: Theodore Frederick Simpson, Lancaster, Pa.

[73] Assignee: RCA Corporation, New York, N.Y.

[22] Filed: Nov. 26, 1975

[21] Appl. No.: 635,369

[52] U.S. Cl. .............................................. 358/10
[51] Int. Cl.² ........................................ H04N 9/62
[58] Field of Search ................... 315/13 C; 358/10

[56] References Cited
UNITED STATES PATENTS 3,916,437  10/1975  Barbin ............................... 358/10

Primary Examiner—Robert L. Richardson
Attorney, Agent, or Firm—Glenn H. Bruestle; William H. Murray

[57] ABSTRACT

In a multi-beam color display tube, having a screen on which phosphor deposits are disposed which are impinged upon by the electron beams so that they luminesce with different colors, one electron beam at a time is activated and scanned while the picture to be displayed is a blank raster. A special post-deflection coil introduces magnetic fields in the region just forward of a deflection yoke to displace the scanned beams in a controlled pattern from their normal landing points on the screen while photosensors measure the light from each color deposit at a plurality of measurement locations on the screen. The displaced beam causes the emission of an error color, the intensity of which is measured by those photosensors which are sensitive to the error color emitted. The intensity of a reference color emitted by the phosphor deposits stimulated by the undisplaced electron beam is then measured. The ratio of the error color to the reference color is then calculated for each measurement location with the largest ratio being displayed as an indication of the color purity tolerance of the tube.

14 Claims, 8 Drawing Figures

METHOD OF MEASURING COLOR PURITY TOLERANCE OF A COLOR DISPLAY TUBE

BACKGROUND OF THE INVENTION

This invention relates to a method of measuring an electron beam landing error of a color display tube and particularly to a method of quantitatively measuring the tolerance of a color television tube to electron beam pertubations caused by temperature changes and/or stray magnetic fields.

The three beams of a color television picture tube must be adjusted in position for several reasons to enable a satisfactory picture to be reproduced on the viewing screen of the tube. Adjustment for color purity is required with all color picture tubes. The purity adjustment provides for the beams to land only on their respective color phosphor elements. Obviously, if the displayed picture lacks purity, the red beam, for example, might land on green or blue phosphors and result in a false color scene reproduction.

In a non-matrix type of color picture tube, the beam portion passing through an aperture of the shadow mask is smaller than the individual phosphor elements on the viewing screen so that when it is properly landed on the desired phosphor element it will not illuminate the adjacent different color elements. In a matrix-type of picture tube, in which dark guard bands separate adjacent different color phosphor elements, the beam portion passing through an aperture may be larger than the phosphor element and still result in color purity. In both types of picture tubes it is desirable to center the respective beams on their phosphor elements to minimize the possibility of a loss of purity if the beams are undesirably moved due to temperature changes of the picture tube or stray magnetic fields.

The distance between an edge of a beam and the adjacent different color phosphor is called purity tolerance. It is generally recognized that purity may be controlled at the center portion of a viewing screen by varying the position of two magnetized purity rings mounted for rotatable motion about the neck of the picture tube. Purity is adjusted at the edge regions of the picture tube by axial movement of the deflection yoke which moves the deflection center of the beams and hence controls their landing position at portions away from the center of the viewing screen.

Beam landing on the phosphor elements of a viewing screen may be observed by viewing the screen with the aid of a microscope. In a tube without guard bands between the phosphor elements, any purity errors, or clipping, can thereby be observed and the purity adjustment may then be made to correct any clipping condition. Such a procedure may be well suited for laboratory work; however, it is too time consuming for use on an assembly line where purity is normally adjusted. In a tube in which there are guard bands between the phosphor elements, the beam edge is hidden behind the guard band and errors in beam landing can be obscured.

On the assembly line, one common arrangement for setting purity is to bias off two of the three color beams and observe the color of the viewing screen. With only the red beam on, for example, ideally the viewing screen would display a pure red field. To accomplish this end, the purity rings around the neck of the tube are rotated to achieve a red field in the center portion of the viewing screen and the deflection yoke is moved to achieve a red field at all other portions of the viewing screen. As a practical matter, such adjustments are very subjective in nature as it is difficult to tell quickly whether the exact desired shade of red is displayed because various colors border the center region as the rings are adjusted and various colors appear in moving patterns around the viewing screen edge portions as the deflection yoke is moved. Utilizing this method of setting purity, even if a red field were obtained, there would be no way of knowing if the purity tolerance of the red beam from clipping blue and green phophor elements was equal. That is, whether the red beam was centered on the red phosphor elements. Thus, even though purity was obtained, it could represent only a marginal condition which could be upset by temperature changes or stray magnetic fields.

U.S. Pat. No. 3,723,801, issued to Oxenham, discloses a method of quantitatively measuring electron beam landing characteristics and adjusting color purity in a shadow mask cathode ray tube. In this method, a detector arrangement is placed in front of the screen, which detector is substantially insensitive to the colors with which the phosphor deposits luminesce which do not correspond to the electron beam activated. A first magnetic field is generated which causes the displacement of the electrons into a first direction. Two different values are successively given to the field in such a manner that the distance between the resultant spots of the electron beam on the screen is of the same order of the largest of the diameters of a phosphor dot or spot of the electron beam on the screen. A first direct current field of adjustable intensity is generated which causes the displacement of the electrons into the first direction. The intensity of this direct current field is adjusted in such a manner that the detector arrangement indicates substantially equal values for the two different values of the field. The measurement of electron beam landing error is then a function of the intensity of the direct current field which is required to cause the substantially equal values. Basically, this method permits the optimization of electron beam landing with respect only to its associated color phosphor elements. This method does not give an indication of purity tolerance, that is, the distance between an edge of a beam and the adjacent different color phosphor, unless it is assumed that the adjacent different color phosphors are perfectly symmetrical with respect to the measured color phosphor landing sites. As a practical matter, the adjacent different color phosphor elements are not perfectly symmetrical. Consequently, even though an electron beam is adjusted to land exactly in the center of its associated phosphor element, satisfactory color purity adjustment may not be attainable in the ultimate use environment due to temperature changes or stray magnetic fields which cause the electron beam to clip adjacent phosphor elements in asymmetrical screens.

SUMMARY OF THE INVENTION

A method of measuring purity tolerance of a color display tube having at least two electron beams and a mosaic of recurring groups of luminescent deposits disposed on a screen, with each group comprising at least two color emitting deposits and each of the deposits being located at a nominal landing point of an associated electron beam on the screen. The method comprises the steps of scanning each of the electron beams across the screen one at a time and detecting and measuring a reference color light output from the luminescent deposit located at the nominal landing point of the scanned electron beam within at least one group of the deposits. The landing point of the scanned electron beam is then displaced between at least two points about the nominal landing point. The peak error color light output only from luminescent deposits within each measured group having colors different from the reference color luminescent deposits are detected and measured. The value of the ratio of the peak error color light output to the reference color light output is determined and provides an indication of the purity tolerance of the scanned electron beam within each measured group. These steps are repeated for each of the electron beams of the color display tube.

DETAILED DESCRIPTION

Figure 1:
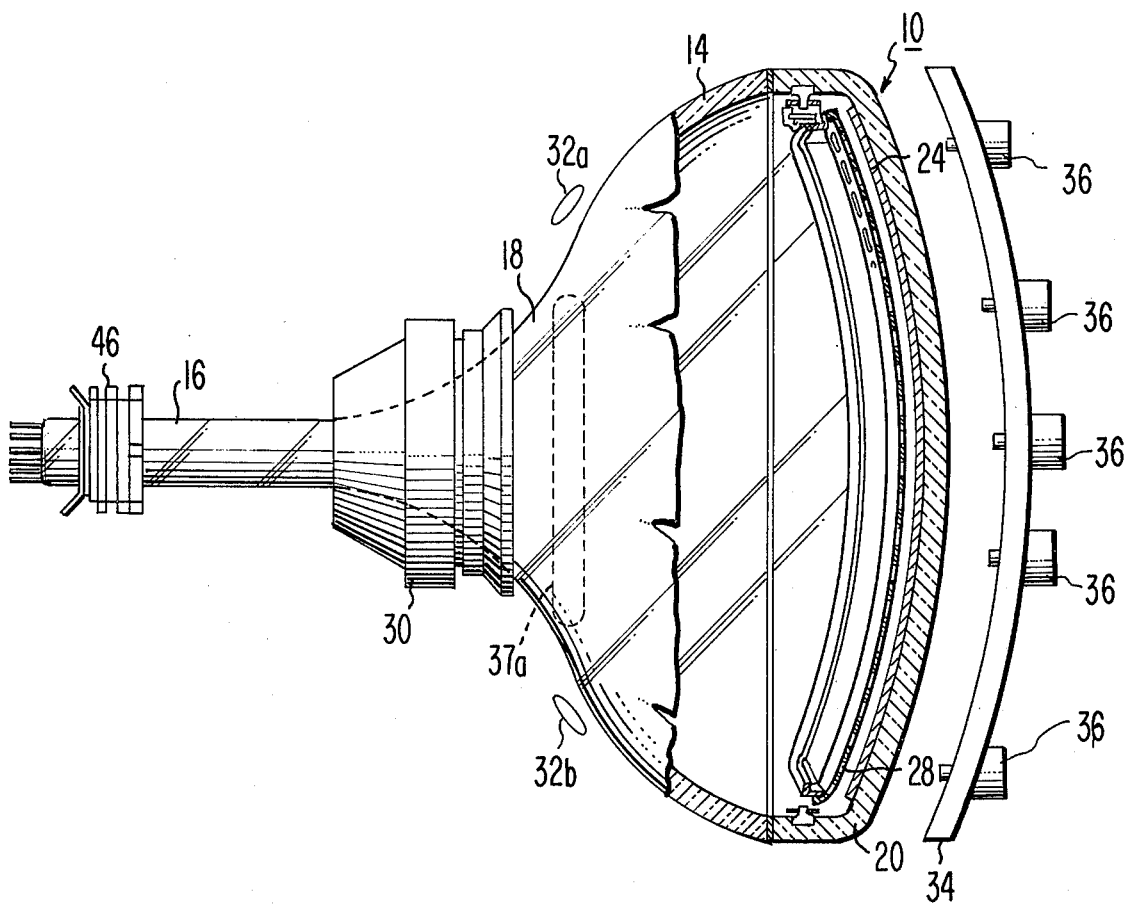
FIG. 1 is a side elevation view, partially broken away, of a color television picture tube showing post-deflection coils and a photosensor array placed in spaced relation thereto.

In FIG. 1 there is shown a color television picture tube generally referred to as 10. The tube 10 is mounted in a yoke application machine, not shown. In addition to providing a mechanical support to the television tube 10 under tests, the yoke application machine provides the voltages and signals required to generate a blank raster display in the television tube under test. As is well known in the art, these voltages include cathode, grid and anode operating voltages, and the signals include vertical and horizontal deflection signals. Note that in performing the method of the present invention, the tube 10 could be mounted in a television receiver which would then supply the necessary voltages, signals and mechanical support.

The television tube 10 comprises a glass envelope 14 having a neck portion 16, a funnel portion 18 and a faceplate panel portion 20. A multi-beam electron gun assembly (not shown) is inserted in the neck portion 16. A viewing screen structure 24 is disposed on an inner surface of the faceplate panel portion 20. The viewing screen structure 24 comprises a mosaic of recurring groups of different color phosphor deposits. An aperture mask 28 is spaced from the viewing screen 24 toward the gun assembly for allowing portions of electron beams generated by the gun assembly to pass through the apertures to strike their respective color phosphor deposits. A deflection yoke 30, comprising horizontal and vertical deflection coils, is mounted on the neck portion 16 of the glass envelope 14. A pair of post deflection coils 32a and 32b are mounted in the vicinity of the funnel portion 18 of the glass envelope 14 between the yoke 30 and the viewing screen 24. A photosensor array 34, comprising a plurality of individual photosensors 36, is positioned opposite an outer surface of the faceplate panel 20.

Figure 2:
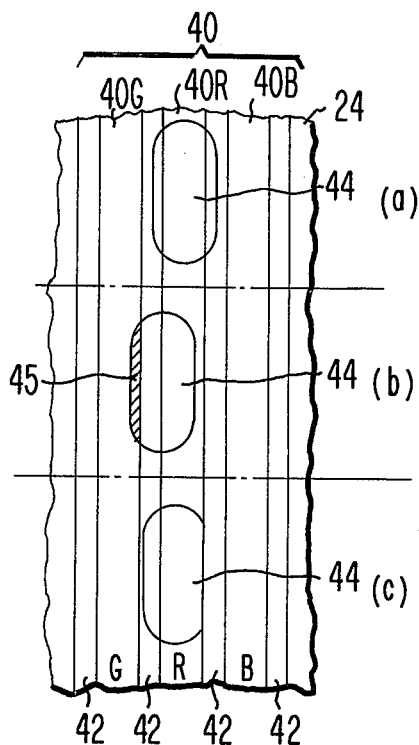
FIG. 2 depicts a portion of a television picture tube screen showing the undisplaced position of an electron spot having no beam landing error relative to an associated phosphor stripe, as well as two additional undisplaced positions, each having a beam landing error.

The viewing screen structure 24 is ordinarily one of two types which are well known in the art; either a line screen type or a phosphor dot type. FIG. 2 illustrates an enlarged view of a portion of the viewing screen structure 24 of the line screen type. In this type of screen structure, the mosaic of phosphor deposits comprises recurring groups or triplets 40 of phosphor stripes. Each triplet 40 comprises three successive stripes of red 40R, green 40G and Blue 40B color emitting phosphors. Such a screen may include black stripes 42 disposed between the phosphor stripes for forming a viewing screen of the matrix type.

An electron beam 44, which emanates from an electron gun in the multi-beam electron gun assembly and is projected through the aperture mask 28 and which is intended to strike only the red color phosphor stripes 40R, is shown in FIG. 2(a) landing centered about a red phosphor stripe 40R of the viewing screen structure 24. It is desirable to have the beam landing 44 centered about its corresponding color phosphor stripe (40R in this example). Such a condition would result in color purity with no clipping of the blue or green phosphor stripes by the red beam 44. FIG. 2(b) illustrated a clipping condition of the red electron beam 44. In this FIGURE it can be seen that a purity error exists which results in the red beam 44 landing outside of its intended landing site, crossing the matrix stripe 42 and exciting a portion, represented by the crosshatched area 45, of the green phosphor stripe 40G. Thus, in FIG. 2(b), an undesirable green clipping condition caused by the red beam 44 exists. When this type of clipping condition exists, a scene which would normally contain, for example, only red colors, would be reproduced as having a red color undesirably diluted with some green.

It is well known in the art that color purity of a color television picture tube may be adjusted by rotational adjustment of color purity rings 46 (see FIG. 1) mounted on the neck portion 16 of the glass envelope 14, as well as axial movement of the deflection yoke 30. The color purity rings 46 are magnetized across a diameter of each ring so that rotation of the rings about the neck portion 16 will cause the electron beams to be displaced in the same direction.

Prior art techniques for adjusting color purity generally involve displaying one color field only, for example red, on a tube under test, then adjusting the color purity rings and the axial location of the yoke until the displayed field was of the proper hue and uniformity throughout the raster. This is a very subjective adjustment and could possibly result in the condition illustrated in FIG. 2(c) where the red beam landing 44 is not centered about its corresponding phosphor stripe 40R. A tube having this condition will appear to be properly adjusted for color purity because it does not actually clip the adjacent green 40G or blue 40B phosphor stripes. However, although the color purity of this tube has apparently been properly adjusted, the tolerance of this tube to extraneous color purity pertubations such as caused by temperature changes and/or stray magnetic fields is poor because a very small extraneous pertubation could cause the red beam 44 to clip the green phosphor stripe 40G as illustrated in FIG. 2B.

The method of the present invention dispenses with the subjective adjustment and yields a quantitative measure of color purity tolerance. Basically, the method comprises the following steps. One electron beam is scanned through four vertical fields while the other two electron beams in a three beam color television picture tube are blanked out. During the first vertical field scan period, the electron beam landing 44 is deflected, as shown in FIG. 3(a), from a an undisturbed beam landing site, represented by the dotted line 46, in a first direction which is substantially perpendicular to the phosphor stripes 40. The amount of deflection is that required to produce approximately a 25% clip of the adjacent phosphor stripe. The value 25% was obtained empirically. A nominal 25% clip is large enough to prevent the error measurements from being obscured on a good tube, that is, one wherein the electron beam landing is centered about its corresponding phosphor stripe, yet small enough to prevent over-ranging on a bad tube, i.e., one wherein the undisturbed electron beam landing spot is poorly centered and may actually clip an adjacent phosphor stripe. The 25% clip is represented by the crosshatched area of the beam landing 44 in FIG. 3(a). A photosensor which is sensitive only to the color of the clipped phosphor stripe (in this example green 40G as shown in FIG. 3(a)) measures the intensity of this first error color, and is used as to set up the 25% clip as well as to measure color purity tolerance.

During the second vertical field scan period, the electron beam landing 44 is deflected, as shown in FIG. 3(b), from the undisturbed beam landing sight 46 by an amount equal but in the opposite direction from the first deflection. A photosensor, which is sensitive only to the color of the second clipped phosphor stripe (in this example blue 40B as shown in FIG. 3(b) measures the intensity of the second error color.

During the third vertical field scan period, no deflection occurs and the beam 44 lands on its undisturbed beam landing site 46 as shown in FIG. 3(c). A photosensor, which is sensitive only to the color of the phosphor at the undisturbed beam landing site 46 (in this example red 40R as shown in FIG. 3(c) measures the intensity of this reference color.

During the fourth vertical field scan period, all electorn beams are turned off allowing the light output from the phosphors to decay. In addition, calculation of the peak error ratio is performed during this fourth period. The calculation involves selecting the larger of the two error color intensities (green and blue for the red field of the above example) and dividing this value by the intensity of the reference color (red for the above example).

Figure 3:
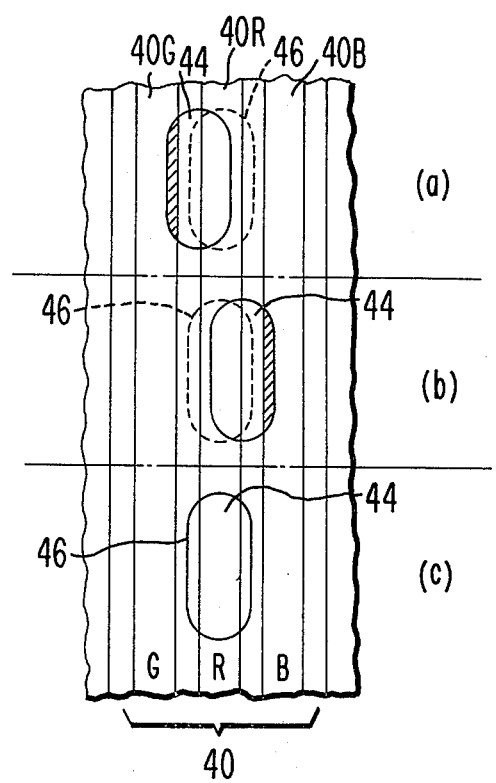
FIG. 3 depicts a portion of a television picture tube screen showing the undisplaced position of an electron spot having no beam landing error as well as two deflected positions of the electron spot obtained by the generation of two magnetic field patterns in the post-deflection coil.

FIG. 3 illustrates the ideal situation where the undisturbed beam landing sight 46 is centered with respect to its corresponding phosphor stripe 40R. In this case, the deflected position of the beam, as shown in FIG. 3(a), will cause the emission of a green error color having substantially the same intensity as the blue error color caused by the deflected beam shown in FIG. 3(b). Consequently, in this ideal case, the quantitative measure of color purity tolerance will be the ratio of the intensity of either the green or the blue error color to the intensity of the red reference color.

Figure 4:
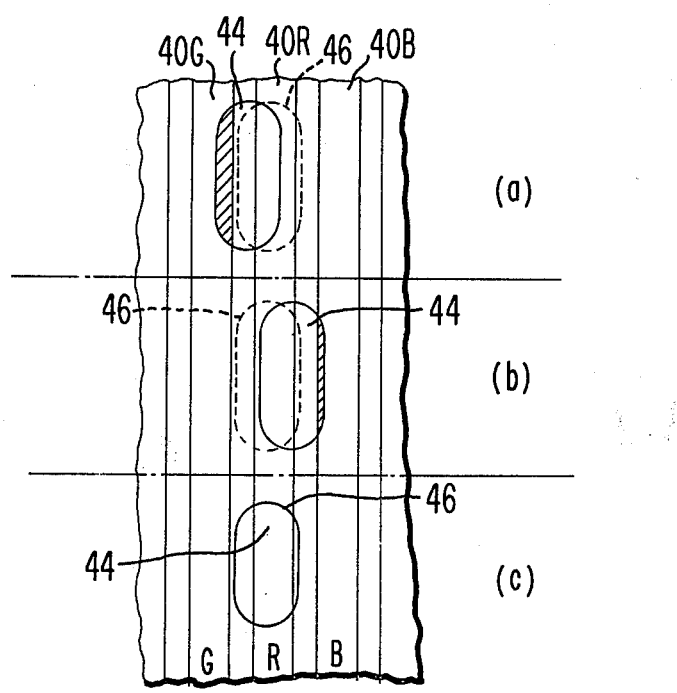
FIG. 4 depicts a portion of a television picture tube screen showing the undisplaced position of an electron spot having a beam landing error as well as two deflected positions of the electron spot.

A more probable situation is depicted in FIG. 4 where the undisplaced position 46 of the red electron beam landing spot 44 is not centered about its corresponding red phosphor strip 40R. In this example shown in FIG. 4, the green error color intensity is larger than the blue as represented by the relative areas of the crosshatched portions of the displaced beam landing spots 44 lying within the green 40G and blue 40B phosphor stripes as shown in FIGS. 4(a) and 4(b) respectively. Consequently, the measurement of the color purity tolerance of the red electron beam at the location depicted in FIG. 4 will be the ratio of the intensity of the green error color to the intensity of the red reference color.

For purposes of clarity, the preceding description of the method of this invention involved the measurement of color purity tolerance for only one color field at only one point on the screen of the tube under test. A more meaningful measure of color purity tolerance will be obtained if the measurement of color purity tolerance is made for all three color fields at a plurality of locations on the screen. It is preferred that these measurements are made at at least 17 locations dispersed throughout the screen in a 4 × 4 matrix pattern as well as one additional measurement location at the center of the screen.

Figure 5:
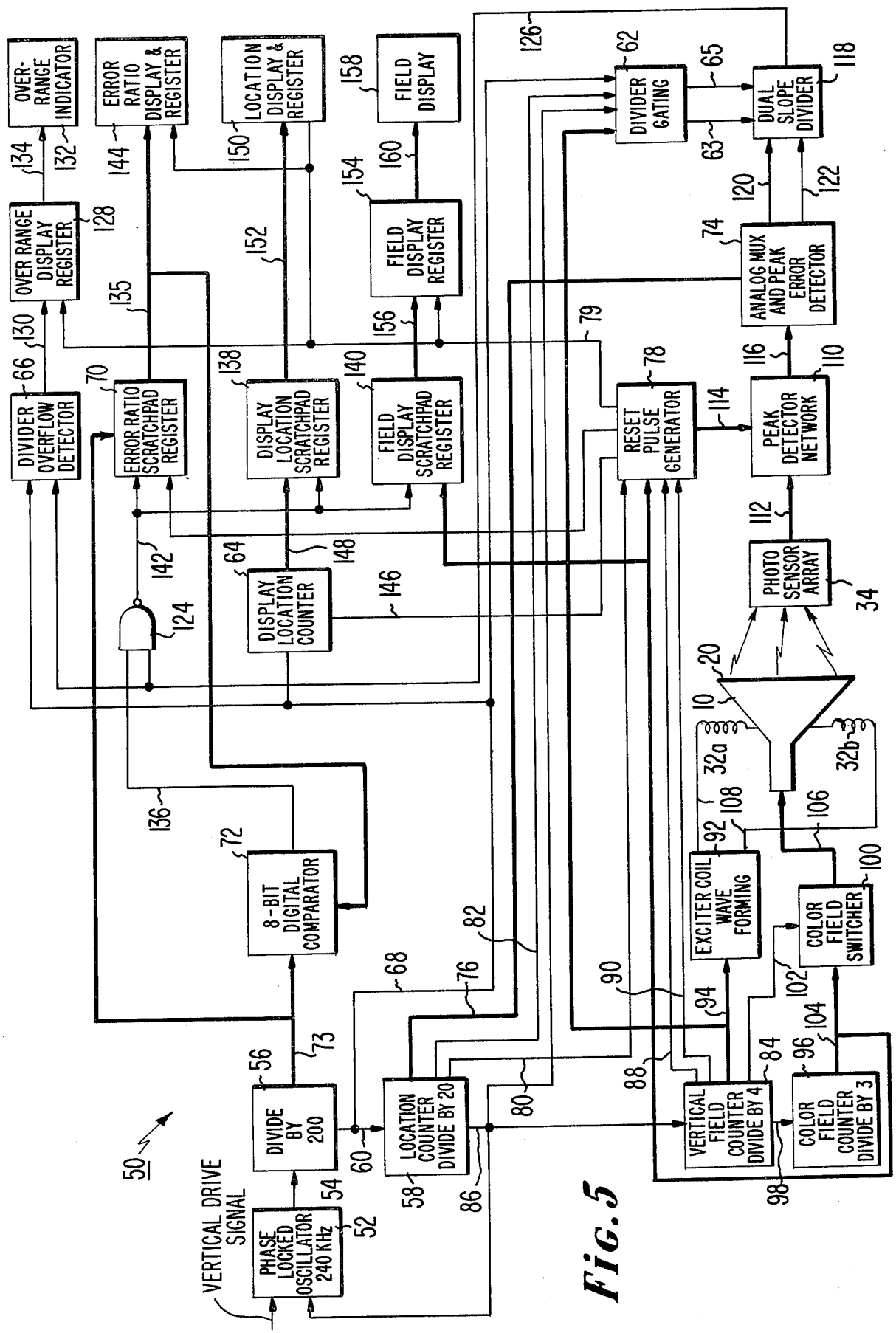
FIG. 5 is a block diagram of an apparatus used to practice the method of the present invention.

A block diagram of the apparatus used to practice the method of the present invention, which will hereafter be referred to as a color purity tolerance meter 50, is shown in FIG. 5. As stated previously, the yoke application machine supplies the voltages and signals required to cause the tube under test to display a blank raster. That is, the electron beams are raster scanned without picture content. Basically, the tolerance meter 50 switches the individual electron beams on and off, supplies the magnetic fields required to displace the beam landing sites about the nominal landing sites, measures the intensities of the reference and error colors at the 17 preferred locations throughout the raster, performs the calculations required to obtain a measurement of overall tube color purity tolerance and displays this measurement along with its corresponding measurement location and color field.

The timing sequence required to practice the method of the present invention is as follows and is developed around the standard television vertical field interval of 16.7 milliseconds with a repetition rate of 60 hertz. As previously stated, there is one beam landing operation $\theta_i$ performed during each vertical field interval; consequently, each $\theta_i$ has an interval of 16.7 milliseconds with a repetition rate of 60 hertz. In addition, there are four beam landing operations $\theta_0, \ldots \theta_3$ performed for each color field $F_R$ (red), $F_B$ (blue), and $F_G$ (green).

Therefore, each F has an interval of 66.8 milliseconds with a repetition rate of 15 hertz. Although the preferred number of measurement locations is seventeen, the tolerance meter 50 has the capability of scanning up to twenty locations $L_0 \ldots, L_{19}$ during each vertical interval. Consequently, each L has an interval of 835 microseconds with a repetition rate of 1.2 kilohertz. An error ratio calculation is performed during each L interval. This calculation comprises measuring a numerator N and a denominator D. The numerator N is measured during the first half of each L interval and the demoninator D is measured during the second half. As a result, the N and D intervals are each 418 microseconds, each with a repetition rate of 2.4 kilohertz. As will be subsequently explained in detail, the value of the error ratio is calculated by using a clock signal C to count up to 100 during the N interval and to count down until a capacitor is discharged to a reference voltage level during the D interval, the error ratio being equal to the number of count down pulses divided by 100; consequently, the repetition rate of the C pulses is equal to 240 kilohertz.

As shown in FIG. 5, the basic timing signal for the tolerance meter 50 is provided by a phase-locked oscillator 52. The phase-locked oscillator 52 generates the 240 kilohertz clock signal C. The clock signal is synchronized with a 60 hertz vertical drive signal from the yoke application machine in order to synchronize the operation of the tolerance meter to the phase of the scanning of the tube under test. An example of a phase-locked oscillator that may be used is a type NE565A Phase Lock Oscillator described in the Signetics Corporation 1972 "Integrated Circuit Catalog."

The 240 kilohertz clock signal C is coupled through a conductor 54 to a divide by 200 network 56. The divide by 200 network 56 generates two output signals. A first divide by 200 output signal is the L clock signal having a frequency of 1.2 kilohertz and an 835 microsecond period. This first output signal is coupled to a divide by 20 location counter network 58 through a conductor 60. The first output signal is also coupled to a divider gating network 62, a display location counter 64 and a divider overflow detector 66 through a branching conductor 68. A second divide by 200 output signal is a parallel eight bit binary coded decimal (BCD) signal coupled to an error ratio scratch pad registor 70 and an eight bit digital comparator 72 through a branching multiconductor path 73. The divide by 200 network 56 comprises a divide by 100 network, the output of which is further divided by 2 using a flip-flop. An example of a divide by 100 network which may be used comprises two cascade connected type SN7490N Decade Counters described in the Texas Instruments Incorporated "Integrated Circuits Catalog for Design Engineers," First Edition. The cascade connected decade counters are in turn connected to a flip-flop which may be of a type such as a CD4013 AE Dual-type Flip-Flop described in the RCA Corporation "COS/MOS Integrated Circuit Catalog" No. SSD-203C, 1975 Edition.

Using the 1.2 kilohertz L clock signal from the divide by 200 network 56, the divide by 20 location counter 58 generates four output signals. A first location counter output signal is a 20 bit parallel digital signal which is coupled to an analog multiplexer and peak error detector network 74 through a multi-conductor path 76. A second location counter output signal is a location reset pulse $L_o$ which is coupled to a rest pulse generator 78 through a conductor 80. A third location counter output signal is a gating signal, having a frequency of 120 hertz and a period of 8.35 milliseconds which is coupled to the divider gating network 62 through a conductor 82. A fourth location counter output signal is a clock signal, having a frequency of 60 hertz, which is coupled to the phase locked oscillator 52, the divider gating network 62 and a divide by four vertical field counter 84 through a branching conductor 86. The 60 hertz clock signal which is coupled to the phase locked oscillator 52 is used as a comparison signal for snychronizing the operation of the tolerance meter to the phase of the scanning of the tube under test.

The divide by 20 location counter comprises a decade counter for dividing by 10, a flip-flop for further dividing by 20, and a decoder select for directing signals from the decade counter to either one of two BCD to decimal decoders which decode the output from the decade counter into a 20 bit parallel signal. Examples of integrated circuit devices which may be used to perform the divide by twenty location counter functions are as follows. All circuits are described in the RCA Corporation "COS/MOS Integrated Circuits Catalog" No. SSD 203C, 1975 Edition. The decade counter can be such as a CD4029AE "Presettable Up/Down Counter." The flip-flop can be such as a CD4013AE Dual D-type Flip-Flop. The decoder select can be a pair of CD4019AE "Quad and/or Select Gates" and a CD4011AE "Quad 2 Input NAND Gate." The BCD to decimal decoders can each be a CD4028AE "BCD to Decimal Decoder."

Using the 60 hertz clock signal from the divide by 20 location counter 58, the divide by four vertical field counter 84 generates five output signals. A first vertical field counter output signal is a first field reset pulse $\theta_o$ which is coupled to the reset pulse generator 78 through a conductor 88. A second vertical field counter output signal is a second field reset pulse $\theta_1$ which is coupled to the reset pulse generator 78 through a conductor 90. A third vertical field counter output signal is a parallel 4-bit digital signal which is coupled to the divider gating network 62 and an exciter coil wave-forming network 92 through a branching multiconductor path 94. A fourth vertical field counter output signal comprises a clock signal, having a frequency of 15 hertz and a period of 67 milliseconds, which is coupled to a divide by three color field counter 96 through a conductor 98. A fifth vertical field counter output signal is a field gating pulse $\theta_3$ which is coupled to a color field switcher 100 through a conductor 102. The divide by four vertical field counter 84 comprises, for example, a CD4001A Quad 2 Input NOR Gate connected to a CD4017AE decade counter divider to form a divide by N counter with N decoded outputs as shown on page 76 of the RCA Corporation "COS/MOS Digital Integrated Circuits Catalog" No. SSB-203, 1972 Edition, where N = 4.

Using the 15 hertz clock signal from the divide by four vertical field counter 84, divide by three color field counter 96 generates a three bit (red, green and blue) parallel digital output signal on three lines. The output signal is coupled to the reset pulse generator 78, the color field switcher 100 and a field display scratch pad register 140 through a branching multiconductor path 104. The output signal comprises three sequential pulses, one on each line, each pulse having a pulse width of 67 milliseconds and a repetition rate of 200 milliseconds. The divide by three color field counter 96 comprises, for example, a CD4001AE Quad 2 Input NOR Gate interconnected with a pair of CD4013AE Dual "D"-type Flip Flops to form a 3-stage ring counter. The color field switcher is an electronic switch which switches the red, blue and green electron guns on and off in accordance with the signals received from the divided by three color field counter 96 and the divide by four vertical field counter 84. The color field switcher 100 comprises, for example, a CD4011AE Quad 2 Input NAND Gate for gating the output signal from the vertical field counter 84 with the output from the color field counter 96. This gated signal is fed to, for example, a CD4010AE Non-inverting Hex Buffer, the output of which provides switching inputs to three 2N6178 transistors which switch the cathode voltages to the red, blue and green electron guns of the tube under test by way of a multi-conductor path 106.

Using the parallel 4-bit digital signal from the vertical field counter 84, the exciter coil waveforming network 92 provides a current waveform to drive the series connected pair of post deflection coils 32a and 32b. The current waveform is applied to the series connected post deflection coils by 32a and 32b by way of a pair of conductors 108. the current waveform creates a magnetic field in the coils 32a and 32b which changes as a function of the applied current waveform in order to deflect the electron beams in the tube under test. The exciter coil waveforming network 92 comprises, for example, a CD4009AE Inverting Type Hex Buffer, the buffered output of which is coupled to, for example, a CD4016AE Quad Bilateral Switch which provides switch inputs to, for example, a SN72741 High Performance Operational Amplifier, as described in the Texas Instruments Inc.'S "Integrated Circuits Catalog for Design Engineers," First Edition. The output of the operational amplifier controls the current output of a current source, for example, a KEPCO Corporation Model BOP 36-5 Voltage Programmed Constant Current Amplifier. This current output forms the current waveform which is applied to the post deflection coils 32a and 32b. The post deflection coils 32a and 32b comprise, for example, a pair of series connected, air wound coils for generating a magnetic field having lines of force which are substantially perpendicular to the horizontal scan direction.

The photosensor array 34, which is positioned opposite an outer surface of the faceplate panel 20 of the tube under test 10, comprises, in the preferred embodiment, 17 photosensors. Each photosensor comprises three silicon phototransistors, such as a type FPT100A, a description of which is found in the Fairchild Corporation "Opto Electronics Handbook." A color filter is disposed between the tube under test and each phototransistor, causing each phototransistor to be responsive only to light of a certain color. For example, a Kodak Corporation Wratten No. 26 Filter is used with a first phototransistor causing the first phototransistor to have an output which is a function of the intensity of red light input only. Similarly, a Kodak Corporation Wratten No. 47B Filter is used with a second phototransistor causing the second phototransistor to have an output which is a function of the intensity of the blue light input only. And, a Kodak Corporation Wratten No. 58 Filter is used with a third phototransistor causing the third phototransistor to have an output which is a function of the intensity of green light input only. The output of each of the three phototransistors is coupled to an inverting amplifier, for example, a National Semiconductor Corp. Type LM312H Operational Amplifier. Since there are 17 photo-sensors in the photosensor array 34 and three phototransistors per photosensor, there will be a total of 3 × 17 or 54 operational amplifiers, each having an output signal which is a function of the intensity of the blue, red or green light measured at one of 17 locations on the viewing screen of the tube under test 10. The 54 outputs from the photosensor array 34 are coupled to a peak detector network 110 by a multiconductor path 112.

The peak detector network 110 comprises an operational amplifier, for example an SN72741P High Performance Operational Amplifier as described in the Texas Instruments Inc.'S "Integrated Circuits Catalog for Design Engineers," First Edition, connected to a Unity-gain Non-inverting Amplifier such as a type LM310H as described in the National Semiconductor Inc., "Linear Integrated Circuits Catalog," June 1973. One operational amplifier and one non-inverting unity-gain amplifier are interconnected to form one peak detector, as shown in FIG. 3.74 on page 99 of the "Applications Manual for Operational Amplifiers," Philbrick/Nexus Research Corporation, 1968, for each of the 54 output signals form the photosensor array 34. The peak detector network 110 also comprises means for resetting each of the peak detectors in preparation for new data. The resetting means comprises, for example, a CD4016AE Quad Bilateral Switch, as described in the RCA Corporation "COS/MOS Integrated Circuits Catalog" No. SSD-203C 1975 Edition, for accepting three discrete reset pulses from the reset pulse generator 78 by way of multiconductor path 114 and using these reset pulses to ground the inputs of each of the non-inverting amplifiers at the appropriate times. The output of each of the 54 peak detectors is a voltage level, the magnitude of which is a function of the intensity of a particular color at a particular location. These outputs are coupled to the analog multiplexer and peak error detector 74 over a multiconductor path 116 having, in this embodiment, 54 lines.

The analog mutliplexer and peak error detector 74 comprises, for example, 18 CD4016AE Quad Bilateral switches for selecting groups of three outputs from the peak detector network 110, each group corresponding to the color intensities at one measurement location, and selecting, in accordance with the color field being scanned, the denominator and two numerators. The numerator signals are compared using, for example, two type SN72741P High Performance Operational Amplifiers as described in the Texas Instruments Inc. "Integrated Circuits Catalog for Design Engineers", First Edition. The larger of the two numerator values, to be referred to hereafter as the peak error signal, is coupled to a dual slope divider 118 through a conductor 120. The denominator value, to be referred to hereafter as the reference signal, is also coupled to the dual slope divider 118 through a conductor 122.

The dual slope divider 118 comprises a differential integrator, for example a type LM312 as described in the National Semiconductor Inc. "Linear Integrated Circuits Catalog", June 1973 Edition, and a switching circuit, for example, a type CD4016AE Quad Bilateral Switch, for switching first the peak error signal, then the reference signal to an input of the differential integrator in response to switching signals received from the divider gating network 62 over conductors 63 and 65. When the peak error signal is switched to the input of the differential integrator, a capacitor is charged for a finite period, for example 418 microseconds, to a level which is a function of the magnitude of the peak error signal. At the end of the charge period, the peak error signal is removed and the reference signal is applied to another input of a differential integrator, causing the capacitor to discharge. When the capacitor discharges to a particular reference voltage, for example 0 volts, an output signal for the dual slope divider 118 changes state. A voltage comparator, for example a type LM311 as described in the National Semiconductor Inc. "Linear Integrated Circuits Catalog", June 1973 Edition, detects when the capacitor discharges to 0 at which time the output of the voltage comparator changes state. This output is coupled to a trailing edge detector which provides a signal when the change of state signal from the voltage comparator is detected. The signal from the trailing edge detector is coupled to a NAND Gate 124 and the divider overflow detector 66 by a branching conductor 126.

The overflow detector 66 provides an overflow signal in the event the capacitor of the dual slope divider 118 does not discharge to 0 volts within a prescribed time limit, for example 418 microseconds. The overflow detector comprises a circuit, such as an RCA type CD4011AE Quad 2 Input NAND Gate, for gating the 1.2 kilohertz signal from the divide by 200 network 56 with the output signal from the dual slope divider. If no output signal appears within the 418 microsecond period of the gating signal, the divider overflow detector generates an overflow signal which is coupled to an over-range display register 128 through a conductor 130. The over-range display register comprises a flip-flop such as contained in type 9314DC "Quad Latch" operated as a "D" Latch as described in the Fairchild Corporation "TTL Data Book", June 1972 Edition. The "D" Latch causes a signal to be applied to the base of a switching transistor such as a type 2N2102 which in turn causes a current to flow through an over-range indicator 132 by way of a conductor 134. The over-range indicator can be an indicator lamp.

The eight bit digital comparator 72 compares the parallel eight bit binary coded decimal signal from the divide by 200 network 56 with a parallel eight bit binary coded decimal signal input from the error ratio scratch pad register received by means of branching multiconductor path 135. When the signal from the divide by 200 network 56 exceeds the signal from the error ratio scratch pad register 70, the digital comparator provides a gating signal to the NAND gate 124 through a conductor 136. With a signal from the digital comparator 72 and the dual slope divider 118 present at its inputs, the NAND gate 124 provides an enable signal to the error ratio scratch pad register 70, a display location scratch pad register 138 and the field display scratch pad register 140 through a branching conductor 142. The enable signal from the NAND gate 124 causes the error ratio scratch pad register 70 to be updated by the parallel eight bit binary coded decimal signal from the divide by 200 network 56. When the enable signal is removed, the error ratio scatch pad register stores the last count received from the divide by 200 network 56 prior to removal. The enable signal is removed when the capacitor in the dual slope divider 118 discharges to zero causing the output signal to change state which provides a signal at one input of the NAND gate 124. Consequently, the parallel eight bit, binary coded decimal signal stored in the error ratio scratch pad register 70 is a function of the ratio of the magnitude of the discharge voltage to the magnitude of the charge voltage or the ratio of the numerator/peak error color intensity to the numerator/reference color intensity. This parallel eight bit, binary coded decimal signal is coupled to an error ratio display and register 144 by one branch of the branching multiconductor path 135. The error ratio scatch pad register 70 comprises eight flip-flops embodied in, for example, a pair of type 9314DC "Quad-latch" integrated circuits as described in the Fairchild Corporation "TTL Data Book", June 1972 Edition.

The error ratio display and register 144 receives and decodes the parallel eight bit, binary coded decimal signal and displays the value as a two digit (units and tens) decimal number upon receipt of a strobe pulse from the reset pulse generator 78 over a branching conductor 79. This two digit number is the quantitative value of the color purity tolerance of the tube under test. The error ratio display and register 144 comprises, for example, two Hewlett Packard type 5082-7302 Numeric Displays with latch and decoder/driver as described in the Hewlett Packard "Optoelectronics Designer's Catalog", 1975 Edition.

The display location counter 64 receives the 1.2 kilohertz signal through the branching conductor 68 from the divide by 200 network 56. The display location counter comprises, for example, a pair of Texas Instruments Inc. type SN7490N Decade Counters which output the location in parallel binary coded decimal format as a function of the count of the 1.2 kilohertz signal. For example, the decade counters are reset at the beginning of each vertical field by a reset pulse received from the reset pulse generator 78 by way of conductor 146. The first 1.2 kilohertz pulse received after reset corresponds to position 1, the second pulse to position 2, etc.

The parallel binary coded decimal output from the display location counter 64 is coupled to the display location scratch pad register 138 by way of a multiconductor path 148. The display location scratch pad register 138 receives and stores the parallel binary coded decimal signal from the display location counter 64, upon receipt of the enable signal from the NAND gate 124 by way of the branching conductor 142. The stored parallel binary coded decimal signal is coupled to a location display and register 150 by a multiconductor path 152. The display location scratch pad register 138 comprises, for example, a pair of type 9314 DC "Quad-latch" Integrated circuits as described in the Fairchild Corporation "TTL Data Book", June 1972 Edition.

The location display and register 150 receives and decodes the parallel binary coded decimal signal and displays the value as a two digit (units and tens) decimal number upon receipt of the strobe pulse from the reset pulse generator 78 over the branching conductor 79. This two digit number is the location (1, . . . , 17) at which the color purity tolerance reading was obtained. The location display and register 150 comprises, for example, two Hewlett Packard type 5082-7302 numeric displays with latch and decoder/divider, the same type as used for the error ratio display and register 144.

The field display scratch pad register 140 receives and stores the color field output signal from the color field counter 96 upon receipt of an enable signal from the NAND gate 124 over a branch of the branching conductor 142. The stored color field signal comprises a parallel three bit digital signal which is coupled to a field display register 154 over a three conductor path 156. The field display scratch pad register 140 comprises, for example, a type 9314 DC "Quad-latch" integrated circuit and a type CD4010AE Non-inverting Hex Buffer, as described in the RCA Corporation "COS/MOS Integrated Circuit Data Book", SSD-203C, for buffering the signals from the color field counter 96. The field display register 154 comprises three "D"latch circuits such as contained in a type 9314DC "Quad-latch"integrated circuit. The output of each "D" latch circuit is coupled to the base of a switching transistor such as type 2N2102. A signal from the "D" latch causes the switching transistor to switch a current through an indicator in a field display 158 by means of a multi-conductor path 160. The field display indicators comprise, for example, three indicator lamps, one for red, one for blue and one for green. The lighted lamp indicates the color field during which the color purity tolerance reading was obtained.

The reset pulse generator 78 receives a location reset pulse $L_o$ from the location counter 58 and generates a reset pulse which initializes the display location counter 64 coincident with the beginning of each vertical field scan. Gating the first field reset pulse $\theta_o$ from the vertical field counter 84 with the red field digital output signal for the color field counter 96, the reset pulse generator outputs a display register strobe signal to the over-range display register 128, the field display register 154, the error ratio display and register 144 and the location display and register 150. This display register strobe signal enables update of the displays every 0.2 second. In addition, the reset pulse generator 78, gating the second field reset pulse, $\theta_1$ from the vertical field counter 84 and the red field digital output signal, provides a scratch pad reset pulse to the error ratio scratch pad register 70 which resets the scratch pad to zero every 0.2 seconds, at the beginning of each cycle. The reset pulse generator 78 also provides signals to reset all of the peak detectors in the peak detector network 110 as previously described, using the three bit parallel digital output signal from the color field counter 96 as well as the first $\theta_o$ and second $\theta_1$ field reset pulses from the vertical field counter 84. The reset pulse generator comprises, for example, a pair of type CD4011AE Quad 2 Input NAND Gates for gating the input signal and a type CD4009AE inverting hex buffer/converter for inverting the input signals from the vertical field counter 84.

In summary, the color purity tolerance meter 50 displays the largest error color ratio as a quantitative measurement of the color purity tolerance of the tube under test. The meter also displays the location at which the measurement was made as well as the associated color field.

Figure 6:
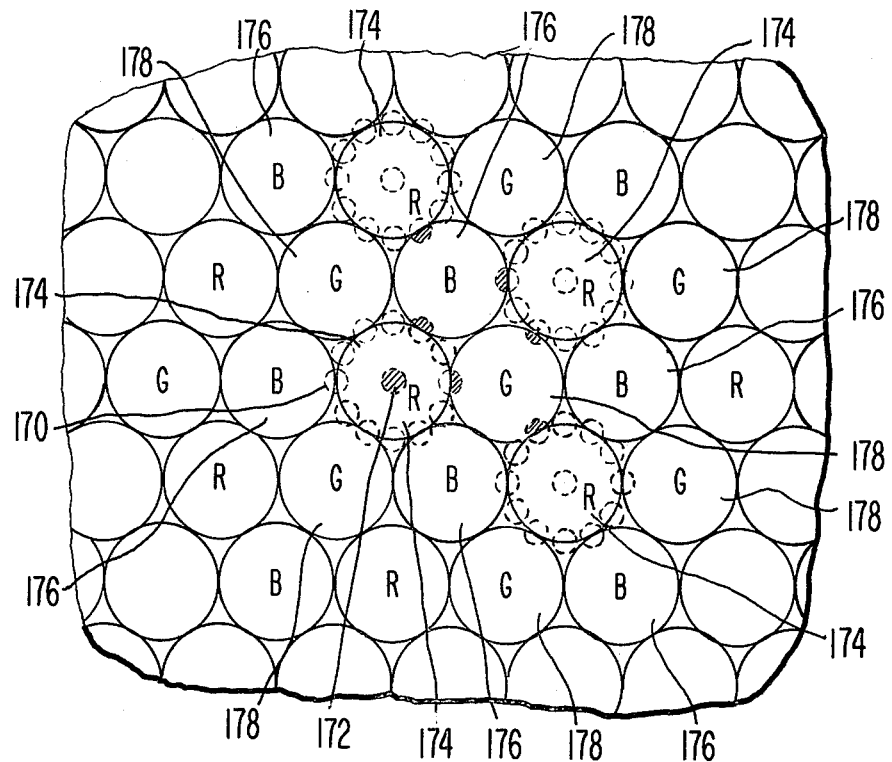
FIG. 6 depicts a portion of a television picture tube screen showing the undisplaced position of the electron spot having no beam landing error relative to an associated phosphor dot as well as twelve deflected positions of the spot, in a circular pattern, obtained by the generation of twelve magnetic field patterns in a pair of post-deflection coils.
Figure 7:
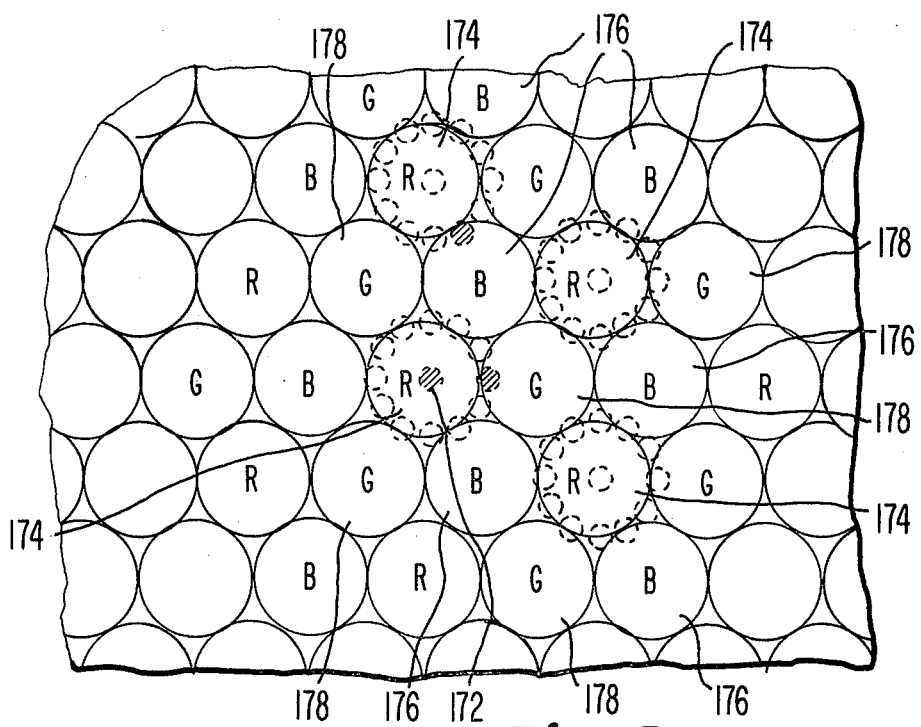
FIG. 7 depicts a portion of a television picture tube screen showing the undisplaced position of an electron spot having a beam landing error as well as 12 deflected positions of the electron spot in circular pattern.
Figure 8:
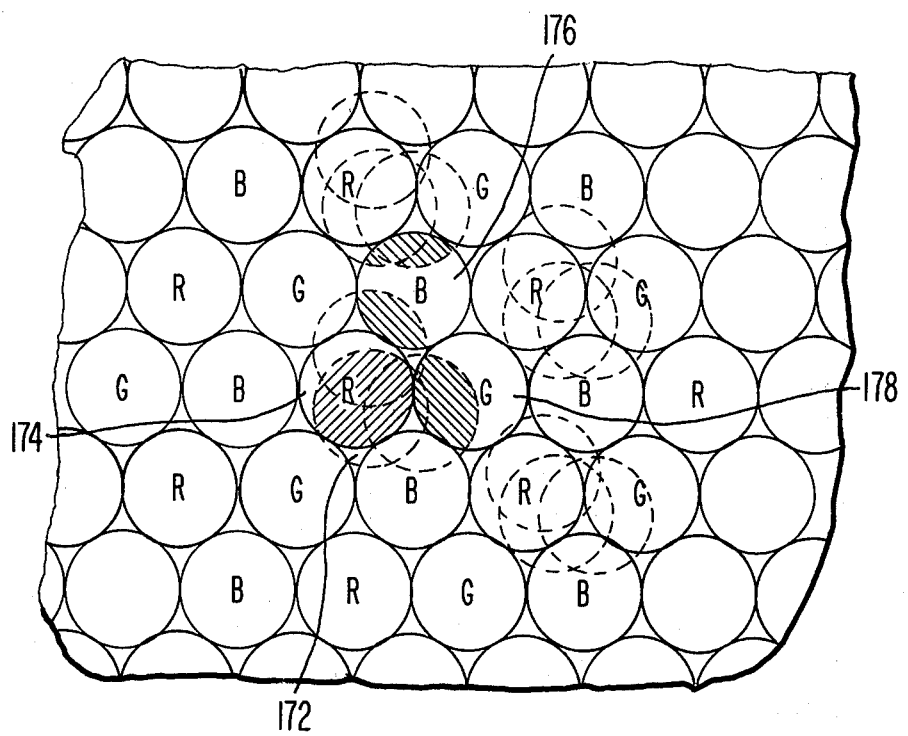
FIG. 8 depicts a portion of a television picture tube screen showing the undisplaced position of an electron spot having a diameter which is comparable to the phosphor dot and having a beam landing error as well as two deflected positions of the electron spot which are representative of a total of 12 positions in a circular pattern.

As stated previously, the viewing screen structure 24 may be a phosphor dot type characterized by a mosaic of recurring groups or triplets of three different color emitting phosphor dots in delta array as shown in FIGS. 6, 7 and 8. Such a screen may include black circles surrounding the phosphor dots for forming a screen of the matrix type. However, the black circles have been omitted from FIGS. 6, 7 and 8 for purposes of clarity. In a color television tube of the phosphor dot type, register degrading magnetic fields can assume any direction in the plane of the screen. To simulate all possible directions of magnetic field, it is desired to move the beam landing spots by an equal amount in all directions in the plane of the screen, that is, move them in a circle about the nominal beam landing spot.

As a compromise between completeness of approximating a circle and a reasonable speed of measurement, a 12 point approximation to a circular motion is chosen as shown in FIGS. 6 and 7. Twelve vertical field intervals are utilized to achieve the 12 point circle approximation. During the first vertical field interval, the beam landing spot is deflected to a first position, for example, the "1 o'clock position", with respect to the undisturbed beam landing spot at every location on the screen. During the second vertical field interval, the beam landing spot is deflected to a second position, for example, the "2 o'clock" position, with respect to the undisturbed beam landing spot. This progression continues through the twelfth vertical field interval during which the beam landing spot is deflected to a twelfth position, for example, the "12 o'clock" position, with respect to the undisturbed beam landing spot.

During the 13th vertical field interval, no deflection occurs and the electron beam lands on its undisturbed beam landing site. During the 14th vertical field interval, all electron guns are turned off to allow the phosphors to completely decay before the next color field. This sequence repeats for 14 vertical field intervals for each of the other two colors.

FIG. 6 shows the 12 deflected positions 170 of a "red" electron beam landing spot which has no landing error. That is, the undisplaced beam landing position 172 lies exactly at the center of each red phosphor dot 174. It is to be noted that, for purposes of clarity, the beam landing spots depicted in FIGS. 6 and 7 are unrealistically small in relation to the phosphor dot size shown. When there is no beam landing error, the 12 point displacement pattern of the beam landing spot will cause error colors of equal intensities to be emitted. In the example shown in FIG. 6, these error colors are indicated by the cross-hatched portions of the beam landing spots lying within the blue phosphor dots 176 and the green phosphor dots 178.

As stated previously, the basic measurement of color purity tolerance is the ratio of the highest error color to the undisplaced reference color at the same location on the screen. Consequently, in the ideal case shown in FIG. 4, the measurement of color purity tolerance will be the ratio of the intensity of either the blue or the green error color to the intensity of the red reference color.

A more probable situation is depicted in FIG. 7 where the undisplaced position 172 of the red electron beam landing spot does not lie at the center of the corresponding red phosphor dot 174. In this case, the blue and green error color intensities are greater than those depicted in FIG. 6 as represented by the relative areas of the cross-hatched sections of the displaced beam landing posts lying within the blue phosphor dots 176 and the green phosphor dots 178 respectively. In addition, the green error color as shown in FIG. 7 is slightly larger in magnitude then the blue error color. Consequently, the measurement of color purity tolerance at the location encompassing the red, blue and green phosphor dots 174, 176 and 178 respectively, will be the ratio of the magnitude of the green error color intensity to the magnitude of the red reference color intensity.

A more realistic representation is depicted in FIG. 8 where the diameter of the electron beam landing spots is comparable to the diameters of the phosphor dots and the undisplaced position 172 of the red electron beam landing spot does not lie at the center of the corresponding red phosphor dot 174. For purposes of clarity, FIG. 8 shows only two of the 12 displaced positions of the red beam landing spot. In this case, green error color intensity is of slightly larger magnitude than the blue as indicated by the relative areas of the cross-hatched portions of the beam landing spots lying within the blue and green phosphor dots 176 and 178 respectively. In addition, the reference color intensity is, as indicated by the cross-hatched portion of the undisplaced beam landing spot 172 lying within the red phosphor dot 174, smaller than it would be if the undisturbed beam landing fell entirely within the reference red phosphor dot 174.

The apparatus used to practice the method of the present invention on a tube having a phosphor dot screen is the same as that used for the line screen type tube with two exceptions due to the fact that there are 14 beam landing operations $\theta_0, \ldots, \theta_{13}$ performed for each color field $F_R$, $F_B$, and $F_G$. First, the vertical field counter divide by four network 84 becomes a vertical field counter divide by fourteen network when used with a line screen tube. Using the 60 hertz clock signal from the divide by 20 location counter 58, the divide by 14 vertical field counter generates five output signals. A first vertical field counter output signal is a first field reset pulse $\theta_0$ which is coupled to the reset pulse generator 78 through a conductor 88. A second vertical field output signal is a twelfth field reset pulse $\theta_{11}$ which is coupled to the reset pulse generator 78 through the conductor 90. A third vertical field counter output signal is a parallel 14 bit digital signal which is coupled to the divider gating network 62 and the exciter coil wave forming network 92 through the branching multiconductor path 94. A fourth vertical field counter output signal comprises a gating signal having an interval of 233.8 milliseconds and a repetition rate of 4.3 hertz, which is coupled to the divide by the three color field counter 96 through the conductor 98. A fifth vertical field counter output signal is a field gating pulse $\theta_{13}$ which is coupled to the color field switcher 100 through a conductor 102. The divide by 14 vertical field counter comprises, for example, a CD4001A Quad 2 Input NOR gate connected to two CD4017AE decade counter dividers to form a divide by 14 counter with 14 decoded outputs as shown in page 76 of the RCA Corporation "COS/MOS Digital Integrated Circuits Catalog SSB-203", 1972 edition.

Using the parallel 14 bit digital signal from the vertical field counter, the exciter coil wave forming network provides a current waveform to drive two pairs of series connected post deflection coils 32a and b and 37a and b (see FIG. 1). Each pair of post deflection coils are oriented between the deflection yoke and the screen in perpendicular relationship to each other. The current waveform is applied to the post deflection coils by way of two pair of conductors. The current waveforms create magnetic fields in each of the coils which changes as a function of the applied current waveform in order to deflect the electron beams in the tube under test. The exciter coils waveforming network comprises, for example, four type CD-4030AE quad exclusive OR gate integrated circuits for sequencing a signal switching network comprising, for example, four types CD4016AE quad bilateral switch integrated circuits. The four quad bilateral switch integrated circuits switch input signals to, for example, a pair of type SN72741 high performance operational amplifiers. The output of each operation amplifier controls the current output of a current source, for example, a KEPCO Corporation model BOP36-5 voltage programmed constant current amplifier. Each current output forms the current waveform which is applied to its respective post deflection coil. Each post deflection coil comprises, for example, a pair of series connected, air wound coils for generating a magnetic field having lines of force which are substantially perpendicular to (generated by the first pair of coils) and parallel to (generated by the second pair of coils) the horizontal scan direction. Using different intensity combinations of these perpendicular magnetic fields, the electron beam landing site will be deflected in the required circular pattern.

It is apparent from the preceding description that the method of the present invention will not only yield a quantitative indication of color purity tolerance, it will also aid in adjusting color purity of the tube under test. As previously stated, color purity is adjusted by moving the neck components, i.e., rotating the color purity rings 46 and moving the deflection yoke along the longitudinal axis of the tube. Using the method of the present invention, the neck components are adjusted for a minimum ratio of error color intensity to reference color intensity in order to maximize the color purity tolerance.

What is claimed is:

1. A method of measuring purity tolerance of a color display tube having at least two electron beams and a mosaic of recurring groups of luminescent deposits disposed on a screen, each group comprising at least two different color emitting deposits, each of said deposits being located at a nominal landing point of an associated electron beam on said screen, said method comprising the steps of:
   a. scanning one of said electron beams across at least a portion of said screen;
   b. detecting and measuring a reference color light output from the luminescent deposit located at the nominal landing point of said one electron beam within at least one group of said deposits;
   c. displacing the landing point of said one electron beam between at least two points about the nominal landing point;
   d. detecting and measuring a peak error color light output only from luminescent deposits within said one group having colors different from said reference color luminescent deposit;
   e. determining the value of the ratio of the peak error color light output to the reference color light output as an indication of the purity tolerance of said one electron beam within said one group; and
   f. repeating the recited steps (a) through (e) for each of the remaining electron beams.

2. The method in accordance with claim 1 wherein said color display tube comprises a color television tube including a multi-beam electron gun assembly which generates three in-line electron beams and a neck portion having a yoke thereon between said screen and said electron gun assembly, and wherein each recurring group of luminescent deposits comprises three different color emitting phosphor strips which are in substantially parallel spaced relation to each other and substantially perpendicular to the direction of electron beam scanning, in which step a) comprises switching two of the electron beams off while the third beam is scanned through three vertical fields.

3. The method in accordance with claim 2 wherein step (c) comprises the steps of
  i. temporarily mounting a post-deflection coil adjacent said neck portion between said yoke and said screen;
  ii. displacing the landing point of the scanned electron beam in a first direction which is substantially perpendicular to said phosphor strips by an amount which is equal to at least one-half the width of the phosphor strip, but no greater than the full width of the phosphor strip, by generating a steady field in said post-deflection coil during the scanning of a first vertical field;
  iii. displacing the landing point by an equal amount in a second direction which is opposite to said first direction by generating a steady field in said post-deflection coil during the scanning of a second vertical field; and
  iv. scanning the electron beam through a third vertical field with no deflecting field in said post-deflection coil.

4. The method in accordance with claim 3 wherein step(d) comprises:
  i. placing a first photosensor adjacent said screen in a measurement location which is substantially opposite the scanned portion of said screen, said first photosensor being sensitive only to the color of the light emitted from a first color phosphor strip, and having an output which is proportional to the amount of light emitted from said first color phosphor strip;
  ii. placing a second photosensor adjacent said screen in said measurement location, said second photosensor being sensitive only to the color of the light emitted from a second color phosphor strip and having an output which is proportional to the amount of light emitted from said second color phosphor strip; and
  iii. measuring the outputs of the first and second photosensors and storing the value of the larger of these outputs as a measure of peak error light output.

5. The method in accordance with claim 4 wherein step (b) comprises:
  i. placing a third photosensor adjacent said screen in said measurement location, said third photosensor being sensitive only to the color of the light emitted from said reference color phosphor strip and having an output which is proportional to the amount of light emitted from said reference color phosphor strip; and
  ii. measuring the output of the third photosensor and storing this value as a measure of reference color light output.

6. The method in accordance with claim 1 wherein recited steps (a) through (f) are repeated 17 times in order to determine the landing error of each of three electron beams within 17 groups of luminescent deposits, each group occupying a preselected position on said screen.

7. The method in accordance with claim 6 comprising the additional step of displaying the measurement location and value of the largest of the ratios as a measure of overall color purity tolerance.

8. The method in accordance with claim 1 wherein said color display tube comprises a color television tube including a multi-beam electron gun assembly comprising three electron guns in a delta array and a neck portion having a yoke thereon between said screen and said electron gun assembly, and wherein each recurring group of luminescent deposits comprises three different color emitting phosphor dots in a delta array, in which step (a) comprises switching two of the electron beam off while the third beam is scanned through 13 vertical fields.

9. The method in accordance with claim 8 wherein step (c) comprises the steps of:
  i. temporarily mounting a post-deflection coil adjacent said neck portion between said yoke and said screen; and
  ii. displacing the landing point of the scanned electron beam through 12 discrete landing points in a substantially circular pattern about the nominal landing point of said scanned beam by generating 12 discrete deflecting fields in said post-deflection coil, one during each of 12 successive vertical field scans.

10. The method in accordance with claim 9 wherein steps (b) and (d) comprise:
  i. placing at least one group of three photosensors adjacent said screen, a first photosensor of said one group having an output which is sensitive only to a first color, a second photosensor having an output which is sensitive only to a second color, and a third photosensor having an output which is sensitive only to a third color;
  ii. measuring the outputs of said second and third photosensor and storing the value of the larger of these outputs as a measure of peak error color light output; and
  iii. measuring the output of the first photosensor and storing this value as a measure of reference color output.

11. The method in accordance with claim 1 wherein said recited steps (a) through (f) are repeated 17 times in order to determine the landing error of each of three electron beams within 17 groups of three different color emitting phosphor dots, each group occupying a preselected measurement location on said screen.

12. The method in accordance with claim 11 comprising the additional step of displaying the measurement location and value of the largest of the ratios as a measure of overall color purity tolerance.

13. A method of measuring purity tolerance in a color television tube including an in-line, three beam electron gun assembly; a mosaic of recurring groups of three different color emitting phosphor strips disposed on a screen in substantially parallel spaced relation to each other and substantially perpendicular to a direction of electron beam scanning, each of said three different color emitting phosphor strips being located at a nominal landing point of an associated electron beam on said screen; and a neck portion having a deflection yoke thereon between said screen and said electron gun assembly, said method comprising the steps of:
  a. temporarily placing 17 groups of photosensors adjacent said screen, each group comprising a first photosensor having an output which is sensitive only to the amount of light of a first color emitted from a first color phosphor strip, a second photosensor having an output which is sensitive only to the amount of light of a second color emitted from second color phosphor strip and a third photosensor having an output which is sensitive only to the amount of light of a third color emitted from a third color phosphor strip;

b. temporarily mounting a post-deflection coil adjacent said neck portion between said deflection yoke and said screen;
c. switching two of the electron beams off while the third beam is scanned through three vertical fields;
d. displacing the landing point of the scanned electron beam toward a first adjacent phosphor strip in a first direction which is substantially perpendicular to said phospher strips, by an amount which is equal to at least one-half the width of a phosphor strip but no greater than the full width of a phosphor strip by generating a steady field in said post-deflection coil during the scanning of a first vertical field and measuring the outputs of the 17 photosensors which are sensitive only to the color of light emitted from said first adjacent phosphor strip;
e. displacing the landing point of the scanned electron beam by an equal amount toward a second adjacent phosphor strip in a second direction which is opposite to the first direction by generating a steady field in said post-deflection coil during the scanning of a second vertical field and measuring the outputs of the 17 photosensors which are sensitive only to the color of light emitted from said second adjacent phosphor strip;
f. storing the value of the larger of the two photosensor outputs in each group as a measure of peak error color light output for each group;
g. scanning the electron beam through the undisplaced landing points during a third vertical field and measuring the outputs of the 17 photosensors which are sensitive only to the color of light emitted from the phosphor strips located at the undisplaced landing points of the scanned electron beam and storing the value of each of these outputs as a measure of reference color light output for each group;
h. determining the value of the ratio of the peak error color light output to the reference color light output for each group and storing the largest ratio as a measure of purity tolerance for said scanned electron beam; and
i. repeating the recited steps (c) through (h) for each of the other two electron beams, and displaying the largest ratio as a measure of purity tolerance for said color television tube.

14. A method of measuring purity tolerance in a color television tube including a delta arranged, three beam electron gun assembly; a mosaic of recurring groups of three different color emitting phosphor dots disposed on a screen in a delta array, each of said three different color emitting phosphor dots being located at a nominal landing point of an associated electron beam on said screen; and a neck portion having a deflection yoke thereon between said screen and said electron gun assembly, said method comprising the steps of:
a. temporarily placing 17 groups of photosensors adjacent said screen, each group comprising a first photosensor having an output which is sensitive only to the amount of light of a first color emitted from a first color phosphor dot, a second photosensor having an output which is sensitive only to the amount of light of a second color emitted from a second color phosphor dot, and a third photosensor having an output which is sensitive only to the amount of light of a third color emitted from a third color phosphor dot;
b. temporarily mounting a post-deflection coil on said neck portion between said deflection yoke and said screen;
c. switching two of the electron beams off while the third beam is scanned through 13 vertical fields;
d. displacing the landing point of the scanned electron beam through 12 discrete landing points in a substantially circular pattern about the nominal landing point of said scanned beam by generating 12 discrete deflecting fields in said post-deflection coil, one during each of 12 successive vertical field scans and measuring the outputs of the two photosensors at each of the 17 locations which are sensitive only to the light emitted from the two phosphor dots adjacent the phosphor dot located at the nominal landing point of the scanned electron beam;
e. storing the value of the larger of the two photosensor outputs in each of the 17 groups as a measure of peak error color light output for each group;
f. scanning the electron beam through the undisplaced landing points during a 13th vertical field and measuring the outputs of the 17 photosensors which are sensitive only to the color of light emitted from the phosphor dots located at the undisplaced landing points of the scanned electron beam and storing the value of each of these outputs as a measure of reference color, light output for each group;
g. determining the value of the ratio of the peak error color light output to the reference color light output for each group and storing the largest ratio as a measure of purity tolerance for said scanned electron beam; and
h. repeating the recited steps (c) through (g) for each of the other two electron beams, and displaying the largest ratio as a measure of purity tolerance for said color television tube.

* * * * *

UNITED STATES PATENT OFFICE
CERTIFICATE OF CORRECTION

PATENT NO. : 4,001,877

DATED : January 4, 1977

INVENTOR(S) : Theodore Frederick Simpson

It is certified that error appears in the above-identified patent and that said Letters Patent are hereby corrected as shown below:

Column 5, line 65, "torn" should read --tron--.
Column 6, line 19, "strip" should read --stripe--.
Column 10, line 25, "form" should read --from--.
Column 14, line 56, "posts" should read --spots--.
Column 15, line 30, --counter-- should be inserted before "output signal"; line 39, at the second occurrence "the" should be deleted.

Signed and Sealed this

Twenty-ninth Day of March 1977

[SEAL]

Attest:

RUTH C. MASON
*Attesting Officer*

C. MARSHALL DANN
*Commissioner of Patents and Trademarks*